United States Patent [19]

Heiskell

[11] Patent Number: 4,471,554
[45] Date of Patent: Sep. 18, 1984

[54] ALARM DEVICE FOR NIGHT FISHING

[75] Inventor: Harold V. Heiskell, Parsons, Kans.

[73] Assignee: HSB Corporation, Parsons, Kans.

[21] Appl. No.: 383,766

[22] Filed: Jun. 1, 1982

[51] Int. Cl.³ .............................................. A01K 97/12
[52] U.S. Cl. ........................................ 43/17; 43/21.2; 43/27.4
[58] Field of Search ........................ 43/17, 21.2, 27.4; 200/52, 61.19, 60, 61.14, 153 M

[56] References Cited

U.S. PATENT DOCUMENTS

| | | | |
|---|---|---|---|
| 2,802,074 | 8/1957 | Pass | 200/61.19 |
| 3,250,036 | 5/1966 | Wenger | 43/17 |
| 3,835,568 | 9/1974 | Whitfield | 43/21.2 X |
| 3,887,910 | 6/1975 | Jones | 200/61.19 X |
| 3,944,760 | 3/1976 | Zdonys et al. | 200/153 M X |
| 4,007,348 | 2/1977 | Van Son et al. | 200/153 M X |
| 4,402,471 | 9/1983 | Normann | 43/27.4 X |

*Primary Examiner*—Nicholas P. Godici
*Assistant Examiner*—M. Jordan
*Attorney, Agent, or Firm*—Edwin H. Crabtree

[57] ABSTRACT

An alarm device used for night fishing. The device is mounted on a standard fishing rod holder with the device receiving a portion of the fishing line between a pair of switch contact arms. When a fish takes the bait, the fishing line is pulled free from the contact arms. The arms then close completing an electrical circuit for lighting a battery operated lamp.

2 Claims, 3 Drawing Figures

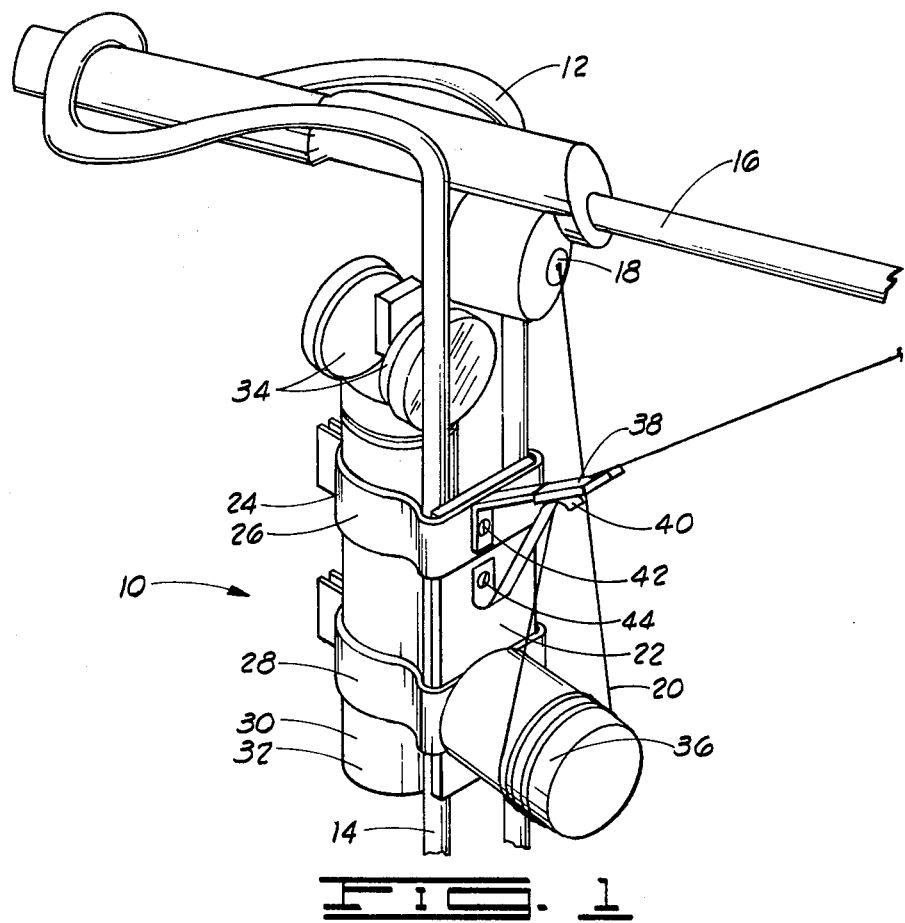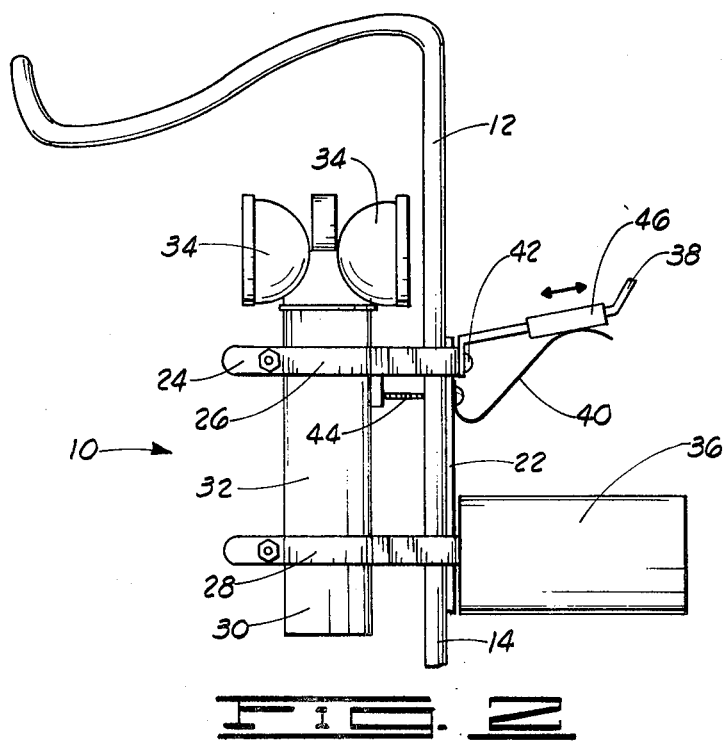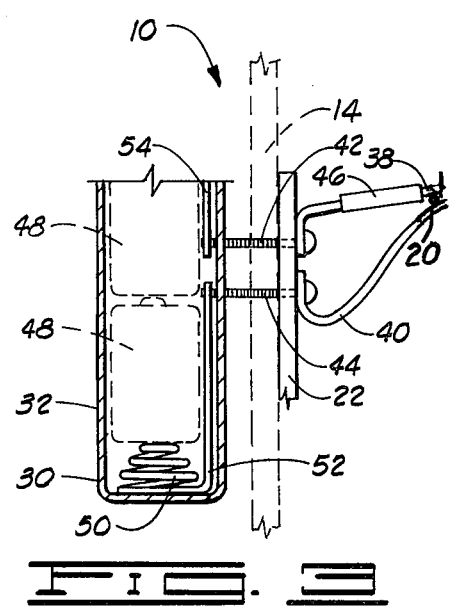

4,471,554

ALARM DEVICE FOR NIGHT FISHING

BACKGROUND OF THE INVENTION

The subject invention relates to an alarm device for alerting a fisherman when a fish has taken fishing bait and more particularly but not by way of limitation to a device which lights a lanp for alerting the fisherman during night fishing.

Heretofore, there have been different types of alarm devices for fisherman and more particularly fishing rod signal lights disclosed in U.S. Pat. No. 2,986,835 to Orninetz et al. and U.S. Pat. No. 3,250,036 to Wenger. Also, a bell alarm device is disclosed in U.S. Pat. No. 2,893,156 to Warren. None of the above devices, using light and bell alarms disclose the unique features and structure of the subject invention as described herein which may be used for mounting on a standard fishing rod holder having a vertical stake. The stake used for inserting into the ground surface with the holder holding a fishing rod, fishing reel and fishing line.

SUMMARY OF THE INVENTION

The alarm device for night fishing alerts the fisherman by lighting a battery operated lamp when a fish has taken the bait from his fishing line.

The alarm device is simple in design, rugged in construction and is readily adaptable for different types of fishing rod holders and more particularly a fishing rod holder having a vertical stake used for inserting into the ground surface.

The invention provides a pair of switch contact arms for receiving a portion of the fishing line therebetween. The fishing line prevents the contact arms from contacting each other and completing an electrical circuit to the battery operated lamp. When the line is removed from between the contact arms due to the fish taking the bait, the arms contact each other thereby lighting the lamp. At the same time the device provides a fishing line spool having the fishing line wrapped therearound. When the fish takes the fishing bait, the line wrapped around the reel plays out allowing the fisherman sufficient time to secure the fishing rod and set the baited hook in the fishes mouth.

Further the battery operated lamp has a double faced lamp head so the fisherman can quickly see when the lamp is lighted from various positions adjacent the fishing rod holder.

The alarm device for night fishing includes a mounting plate having a mounting bracket attached thereto and adapted for receipt around the vertical stake of the fishing rod holder. A battery operated lamp is attached to the mounting bracket. A fishing rod spool is mounted on the mounting plate for receiving the fishing line therearound. First and second switch contact arms are mounted on the mounting plate and electrically connected to the lamp. The arms are separated from each other when placing a portion of the fishing line therebetween or a switch release insulator which is mounted on one of the contact arms. When the arms are allowed to contact each other the circuit is closed thereby lighting the lamp.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 is a perspective view of the alarm device mounted on a fishing rod holder holding a fishing rod with fishing reel and fishing line.

FIG. 2 is a side view of the alarm device mounted on the fishing rod holder with the fishing rod removed.

FIG. 3 is a side sectional view showing a portion of the battery operated lamp cut away exposing the electrical circuit connected to the contact arms of the alarm device.

DETAILED DESCRIPTION OF THE DRAWINGS

In FIG. 1 the alarm device for night fishing is designated by general reference numeral 10. The alarm device 10 is adapted for mounting on a standard fishing rod holder 12 having a vertical stake 14 used for inserting the holder 12 into the ground surface. In this figure the rod holder 12 is shown holding a fishing rod 16 having a fishing reel 18 mounted thereon with a fishing line 20 extending outwardly therefrom for attaching to a baited fish hook.

The alarm device 10 includes a mounting plate 22 having a mounting bracket 24 mounted thereon. The mounting bracket 24 includes a pair of mounting bracket straps 26 and 28 which are adapted for receipt around the vertical stake 14 and securing the device 10 thereon. The straps 26 and 28 also hold a battery operated lamp 30 thereon. The lamp 30 includes a battery holder tube 32 and a double faced lamp head 34. A fishing line spool 36 for receiving a series of wraps of the fishing line 20 therearound is attached to the mounting plate 22.

A first switch contact arm 38 and a second switch contact arm 40 are attached to the mounting plate 22 and electrically connected by contact leads 42 and 44 as shown more clearly in FIG. 3. The arms 38 and 40 are separated from each other when placing a portion of the fishing line 20 therebetween as shown in FIG. 1 and FIG. 3. When the fishing line 20 is pulled free when the fish takes the baited hook, the two switch arms 38 and 40 are biased toward each other thereby closing the electrical circuit to the lamp 30 and lighting the light in the lamp head 34.

Also, mounted on the first switch arm 38 is a switch release insulator 46 which is slidably mounted on the arm 38. When the device 10 is not in use the insulator 46 is moved forward on the arm 38 for receipt between the ends of the two switch arms 38 and 40 to prevent them from contacting each other and closing circuit for lighting the lamp 30.

In FIG. 2 the fishing rod 16 has been removed from the holder 12. In this view, the insulator 46 has been moved forward on the arm 38 and positioned between the biased ends of the switch arms 38 and 40 to prevent them from contacting each other. Also in this view, the fishing line 20 has been removed from around the fishing line spool 36. It should be noted the spool 36 allows the fisherman to wrap the line 20 a number of times around the spool 36 so when the line 20 is released from between the switch arms 38 and 40 sufficient line 20 is provided in order to play the hooked fish and give the fisherman sufficient time to secure the fishing rod 16 and set the hook in the fishes mouth.

In FIG. 3 a portion of the battery holder tube 32 has been cut-away to expose a pair of batteries 48 positioned one on top of the other with the lower battery 48 disposed on top of a contact coil 50. The contact coil in turn is connected to a lower battery lead 52 which in turn is connected to the contact lead 44. The contact lead is connected to the second contact arm 40. The first contact arm 38 is connected to the contact lead 42. The contact lead 42 is connected to an upper battery lead 54 which is connected to the light inside the lamp head 34. The light is not shown in the drawings. It can be appreciated when the fishing line 20 or insulator 46 is removed from between the two switch arms 38 and 40 the circuit is completed to the light of the lamp 30.

Also shown in FIG. 3 and in dotted lines is a portion of the vertical stake 14 of the rod holder 12 which is used for securing the alarm device 10 thereon.

Changes may be made in the construction and arrangement of the parts or elements of the embodiments as described herein without departing from the spirit or scope of the invention defined in the following claims.

What is claimed is:

1. An alarm device for night fishing, the device adapted for mounting on a fishing rod holder with vertical stake used for inserting the holder into the ground surface, the fishing rod holder holding a fishing rod with fishing reel and fishing line thereon, the device comprising:

a vertical mounting plate;

a pair of horizontal mounting straps attached to the plate and adapted for receipt around the vertical stake of the fishing rod holder;

a battery operated lamp engaged by the mounting straps and secured thereto, the lamp having a lower battery lead connected to a contact coil for engaging a battery and an upper battery lead connected to a light for engaging a battery;

a fishing line spool mounted on the plate and extending outwardly toward the end of the fishing rod, the spool used for receiving fishing line thereon; and a first and second switch contact arm mounted on the plate and extending outwardly therefrom toward the end of the fishing rod, the first arm connected to the upper battery lead by a contact lead, the second arm connected to the lower battery lead by another contact lead, the arms separated from contacting each other and closing the circuit for turning the lamp on when a portion of the fishing line is placed between the first and second switch contact arms, the arms contacting each other when the line is removed therefrom.

2. The alarm device as described in claim 1 further including a switch release insulator slidably mounted on one of the contact arms, the insulator positioned between the two arms when the device is not in use.

* * * * *